United States Patent [19]
Matherne et al.

[11] Patent Number: 5,706,863
[45] Date of Patent: Jan. 13, 1998

[54] PIPE SECTION HAVING PADEYE ATTACHMENTS

[75] Inventors: Lee Matherne, Houston, Tex.; Tommy A. Hebert, New Iberia; John D. Jeter, St. Martinville, both of La.

[73] Assignee: Premiere, Inc., New Iberia, La.

[21] Appl. No.: 532,249

[22] Filed: Sep. 22, 1995

[51] Int. Cl.[6] .................................................. E21B 19/16
[52] U.S. Cl. ........................................................ 138/103
[58] Field of Search ........................... 228/49.4; 138/106, 138/107, 103

[56] References Cited

U.S. PATENT DOCUMENTS 4,475,726   10/1984   Smith .............................. 228/49.4 X Primary Examiner—Kenneth J. Ramsey
Attorney, Agent, or Firm—John D. Jeter

[57] ABSTRACT

Improved welding method and padeye processing speeds up the connection of individual joints by peripheral fusion welding while the joint to be added stands vertically atop an existing pipe string also standing vertical in the rig floor. A plurality of welders can operate to speed up completion of the weld by removing heat from the pipe during the welding process. Heat is removed by the use of fluid cuffs near the weld area and, optionally, by using a spool within the pipe string to dispense expansion cooled air against the inner pipe wall in the vicinity of the weld. A special improved padeye is provided for welding near the pipe ends for handling. The padeye has a divided profile, a hole for a lifting shackle, and it will be accepted within the skirt of the lead system of the driving hammer. The upper end of the padeye can be cut from the pipe while the pipe is resting, on rig related structure, on the lower surface of the padeye.

2 Claims, 5 Drawing Sheets

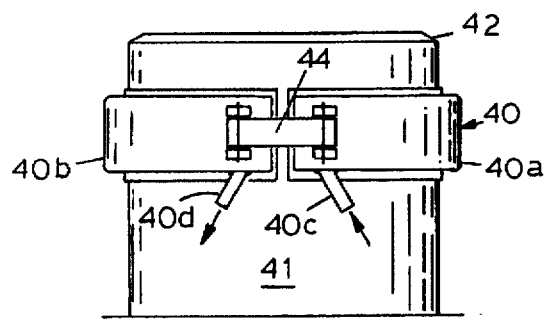
FIG. 13
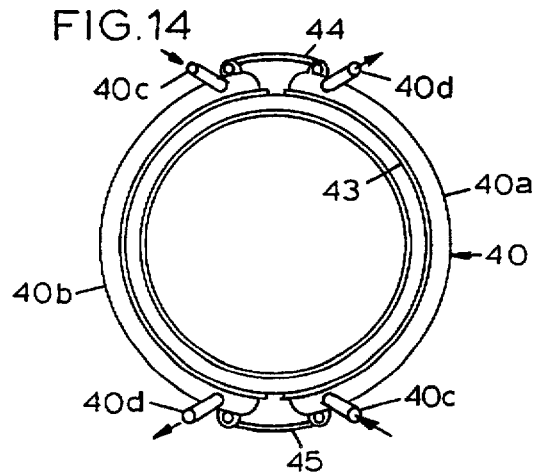
FIG. 14
FIG. 15
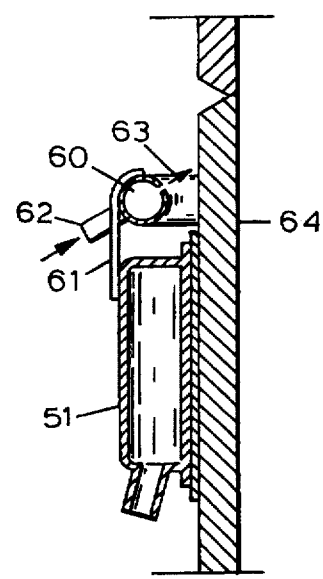
FIG. 16
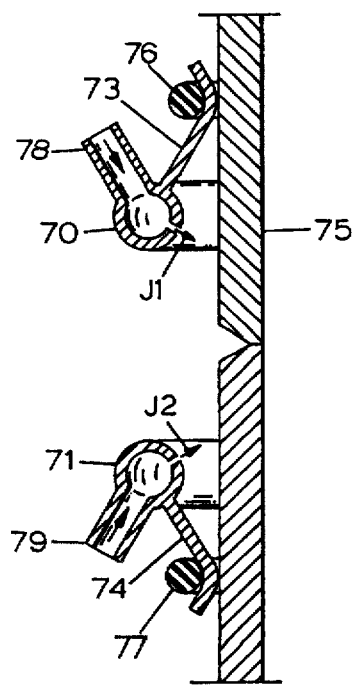
FIG. 17

PIPE SECTION HAVING PADEYE ATTACHMENTS

This invention pertains to the joining by welding of serial sections of pipe to form a conductor pipe or bottom standing column to support off shore structures and the like. The objective is to improve the method and provide apparatus to make that improvement possible.

BACKGROUND OF THE INVENTION

The first lengths of pipe in oil and gas wells are usually called a conductor pipe, used to protect shallow water sources and to support smaller and longer strings added later, and are often welded together in serial joints as they are driven into the earth by pile driving hammers. The individual joints may be forty feet long. The usual string may include in the order of ten joints. For off shore stand alone columns driven into the sea floor the length may be hundreds of feet. The first joints driven down may be handled differently for different applications. After the first joint is driven down, in most cases, to place the top of the joint near what is usually called the rig floor another joint is positioned on top and aligned for joining by arc welding. There are steps in the process that can be carried out during unrelated activities so that those steps are not parasitic to the time schedule.

Some definitions are in order and apply herein. Driving pipe requires hoisting machinery which requires some form of support referred to as a rig. Supports for workmen and devices used to temporarily support pipe will be called a rig floor. Hoists are often called draw works whether in a drilling rig or in a crane type lifting machine. Lifting lugs welded to the side of pipe have acquired the definition of a padeye. A padeye may have a hole for a clevis bolt of may have a large hole suitable for hooks to engage.

Padeyes are welded near the pipe ends for handling both before hoisting into the rig and during hoisting and preparation for driving and their presence and removal represents a time burden that redesign and changes in processing can reduce. Before the joints enter the earth the padeyes often have to be removed and usually the pipe in the vicinity of the weld has to be ground smooth. This is a time consuming process that has become rather standardized. The usual padeye extends too far radially to enter the skirt of the driving hammer lead, or guide, system and they have to be spaced from the pipe end and have to be removed in preparation for further processing. There is a need for a padeye that will enter the skirt of the hammer lead system that is used to align the hammer on the pipe and to keep it in place as hammering proceeds. Padeyes commonly used have evolved into unnecessarily large devices, quite out of proportion to the purpose served. By reducing the distance between the pipe outer surface and the point of attachment of lifting shackles the resulting cantilever bending moment is reduced and less welding metal is needed between padeye and pipe. A new design is needed that will permit the padeye to be partly cut away while the pipe joint is being supported by the lower surface of the padeye resting upon rig floor related structure before a newly attached upper pipe joint is used to lift the string to permit the padeye to be totally removed.

Conductor pipe and support pilings have become quite massive in modern practice, with thick wall pipe being used and haste in welding serial joint connections presents thermal problems. The welding process often produces enough heat to alter the metallurgical condition of the pipe for some distance from the weld. This matter is worsened by the need for speed in welding which is accomplished by using several welders working simultaneously on one connection. Little is gained if the welding process creates such temperature that other processes must wait while the pipe cools to an acceptable temperature. The heat needs to be removed from the pipe adjacent the weld even as the temperature is rising but within acceptable levels, to avoid the eventual overheat and avoid the cool down time that is parasitic to the time schedule.

It is therefore an object of this invention to provide a form of padeye that is near the pipe surface to reduce cantilever loads and to enter the driver lead skirt so that the padeye can be placed closer to the end of the joint.

It is another object of the invention to provide a padeye, and method for its use, of such construction that part of the cutting required for its removal can be carried out while the lower end of the padeye supports the pipe on the structure supported by the rig floor.

It is yet another object of the invention to provide cooling cuffs, and related methods for use, that encircle the pipe on at least one axial side of the peripheral joining weld to remove heat while welding proceeds.

It is still another object of the invention to provide heat conducting pliable sheet material between cooling cuffs and the pipe outer surface to conduct heat in areas where pipe outer surfaces are irregular and separate from the circular cuff.

It is yet another object of the invention to provide a removable cooling spool, and related methods for its use, inside the pipe sections to be joined in the area being welded, to cool the pipe from the inside.

These and other objects, advantages, and features of this invention will be apparent to those skilled in the art from a consideration of this specification, including the attached claims and appended drawings.

SUMMARY OF THE INVENTION

The improved process involves selection of padeyes, provided by the invention, that will be accepted by the skirt of the lead system on a driving hammer and placing them near the end of the pipe joint. The padeye has an open unwelded center portion that enables a welder to cut the upper portion of the padeye while the lower part still remains intact and able to support the pipe string by resting upon the rig floor extended structure. Welding of the new joint atop the supported joint proceeds at a greater pace, by a plurality of welders, permitted by the use of cooling cuffs, also provided by the invention, near the peripheral weld to reduce the peak temperature reached by the operation. The cuffs are removed and the pipe string is lifted by the newly attached joint, the floor supported structure is removed, and the remaining uncut portion of the padeye is removed.

An optional cooling spool is lowered down the pipe bore from atop the new joint being attached and pressurized air is expanded from nozzles on the spool against the inner surface of the pipe to cool the pipe while welding proceeds. If used, the spool is removed before the hammer is placed atop the newly attached joint to continue driving the string.

BRIEF DESCRIPTION OF DRAWINGS

In the drawings wherein like features have similar captions.

FIG. 13 is a side elevation of a cooling cuff for pipe.

FIG. 14 is an elevation of the cuff of FIG. 13 seen from below, the pipe is not cut.

FIG. 15 is a section, somewhat enlarged, taken from the left side of FIG. 13 with the cuff and one side of the pipe sectioned. It may be regarded as a thin section.

FIG. 16 is a section similar to that of FIG. 15 showing an optional air distribution cooling ring added.

FIG. 17 is a section from the aspect of FIG. 15 with the cooling cuff comprising a toroidal air distribution ring on each side of the weld to be made for a pipe joining operation.

DETAILED DESCRIPTION OF DRAWINGS

Figure 1:
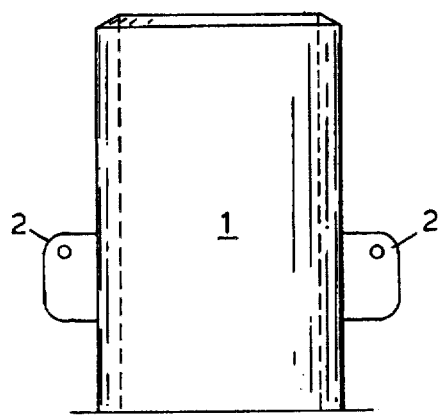
FIG. 1 is a side view of the conventional pipe end with padeyes attached that make some steps of the invented process impractical.

In FIG. 1 a conventional arrangement of the end of a pipe section 1 to be used in joining with other similar joints to form a conventional driven pipe string. The padeyes 2 are too long radially to enter the skirt of a driving hammer and have to be placed too far down for comfortable welding of the peripheral joint weld when another joint is to be fitted to the top.

Figure 2:
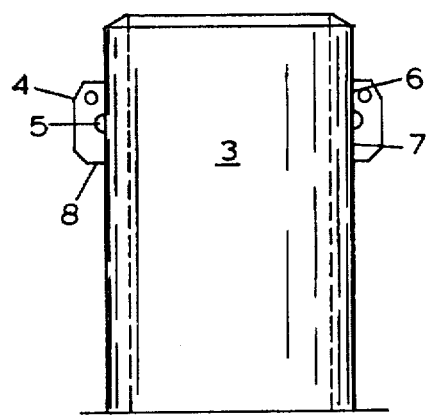
FIG. 2 is a side view of the preferred padeye near the top of the joint, otherwise similar to that of FIG. 1.

In FIG. 2 the preferred padeyes 4 are attached to the pipe 3 near the end. It is radially dimensioned to fit into the hammer skirt and has opening 5 near the center so that the top weld 6 can be cut away while the lower weld 7 is sufficient to support the pipe resting on the padeye surface 8.

Figure 3:
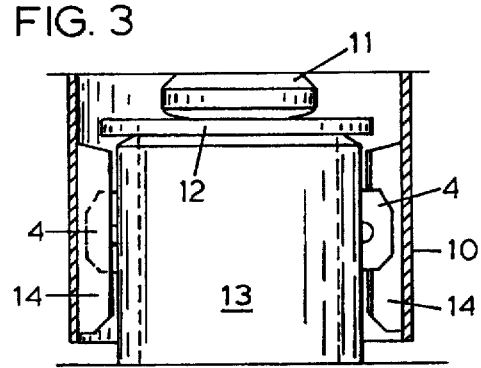
FIG. 3 is a sectional view, taken along line 3 of FIG. 4, of the end of a joint, with new padeyes attached, being driven down by the usual pipe driving hammer.

FIG. 3 shows the hammer skirt 10, anvil 11, and impact transfer plate 12 fitted over pipe 13 for driving. Alignment fins 14 which are attached to the skirt are shown to clear the padeye 4. The skirt tube only is cut along line 3 of FIG. 4. Excepting the padeyes, all shown in FIG. 3 represents current practice.

Figure 4:
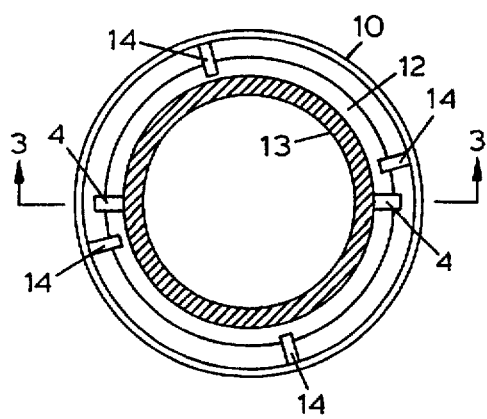
FIG. 4 is a view from the bottom of the hammer skirt with only the pipe cut, showing the preferred padeyes in place.

FIG. 4, viewed from below FIG. 3, shows only the pipe is cut. Padeyes 4 freely enter the skirt 10.

Figure 5:
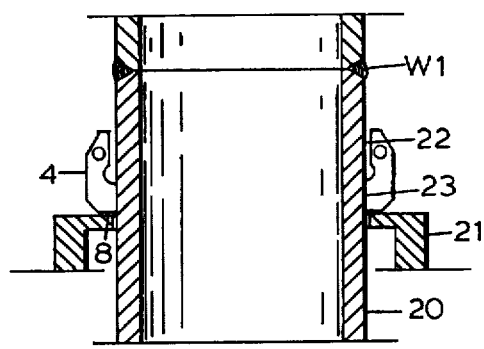
FIG. 5 is a sectioned side view of the top of a driven down pipe resting on padeyes, with an upper section of pipe welded in place.

In FIG. 5, viewed from the same aspect as FIG. 3, The pipe 20 and rig floor related supports 21 are sectioned. The upper length of the padeye weld 22 is shown to be cut. The lower weld length 23 is still intact and able to support the pipe resting on the lower surface 8 of the padeyes. The weld W1 is shown complete and the upper joined section 24 can now lift the pipe string.

Figure 6:
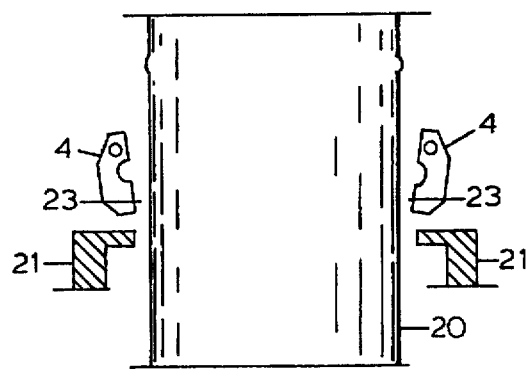
FIG. 6 is from the same aspect as FIG. 5 with the pipe string supported by the upper section, with the padeyes cut away and the rig floor related support structure being removed.

In FIG. 6 the pipe string is lifted by the rig draw works, the lower length 23 of the padeye weld is cut to complete removal of the padeye and the rig floor related supports 21 are being removed. In conventional practice the hammer can now be placed atop the newly joined section and the pipe driving can proceed.

Figure 7:
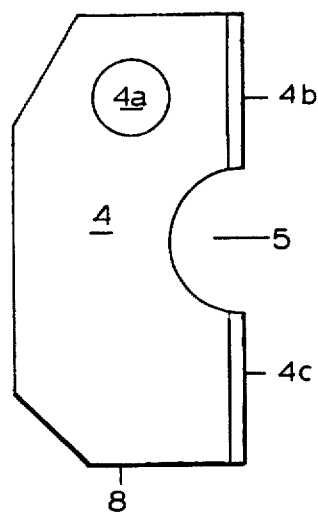
FIG. 7 is a side elevation of the preferred padeye prepared for welding to pipe.
Figure 8:
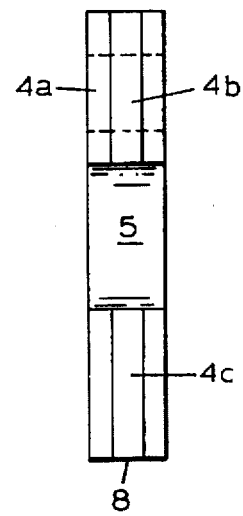
FIG. 8 is an orthogonal view of the padeye of FIG. 7.
Figure 9:
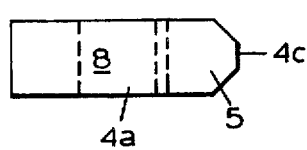
FIG. 9 is an orthogonal view of the padeye of FIG. 7 as seen from below.

FIGS. 7, 8, and 9 show the improved padeye configuration needed to insert the pipe with padeyes attached into the hammer guide skirt as shown in FIG. 3. Eye 4 has shackle bolt hole 4a, opening 5 to assure a divided length of weld along edges 4b and 4c which are usually beveled as shown. The support base 8 is usually, but not necessarily, planar and perpendicular to edge 4c.

Figure 12:
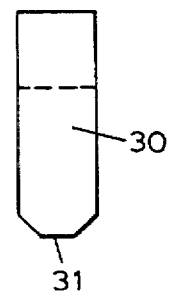
FIG. 12 is an orthogonal view of the padeye of FIG. 10 viewed from the top.
Figure 10:
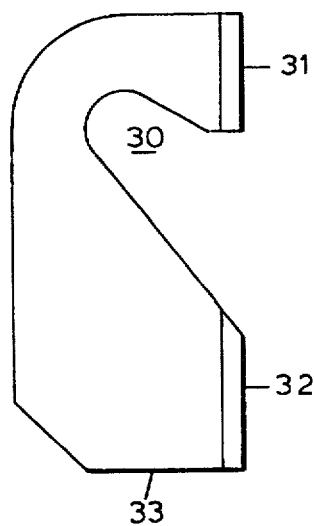
FIG. 10 is a side elevation of an alternate form of the padeye of FIG. 7.
Figure 11:
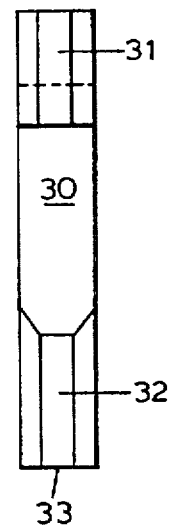
FIG. 11 is an orthogonal view of FIG. 10 seen from the pipe side.

FIGS. 10, 11, and 12 show an alternate form of the padeye of FIG. 7, usually used on lighter pipe, that provides opening 30 that is shaped to interrupt the weld and accept a shackle bolt. Base 33 and edges 31 and 32 serve the same function as those features on the padeye of FIG. 7.

FIGS. 13, and 14 show a water cooled cooling cuff 40 on pipe 41 in preparation for welding an upper joint at bevel 42. The two arcuate portions of the cuff cooperate to form an interrupted toroidal tube. The two halves 41a and 41b are essentially identical and have a cylindrical bore 43. The cuff is peripherally pulled against the pipe by clamp links 44 and 45. Each half has a fluid inlet port 40c and a fluid outlet port 40d. Water is usually available at a rig site and may be adequate as a cooling fluid without conditioning such as chilling. A cuff may be used above, below, or both above and below the weld. When used above the weld, FIG. 17 shows the preferred departure direction for inlet and outlet tubes, to clear the weld area for workers. For use above a weld, cuff 40 is turned upside down.

FIG. 15 shows an enlarged portion on the left side of FIG. 13 cut to show the usual tubular construction. FIG. 15 also shows a heat transfer pad 50 of resilient heat conducting plastic used to fill voids when the pipe to be welded is not truly cylindrical on the outer surface. This is a common problem. The heat conducting plastic is available from Thermon Corporation doing business in San Marcos, Tex. It deforms as required for this application and is reusable. The usual sheets are one eights inch thick and work well in tests. Tube 40b is shown as a single pass arrangement and with a copious water supply serves quite well. Port 40c is a fluid inlet. The tube 40d, not shown, is identical. The position on pipe 41 is optional but is usually far enough from the peripheral weld, not shown, to allow welders adequate access.

FIG. 16 is seen from the same aspect as FIG. 15 and differs only by the addition of a toroidal air distribution tube 60 attached to the water cooled cuff 51 by supports 61. This tube also is made in two arcuate sections to form an interrupted toroid. It requires no peripheral clamps of its own. Air under pressure is admitted through port 62. Air jets 63 are directed against pipe 64. These jets are holes in tube 60 and are distributed peripherally at about twenty degree intervals, depending on pipe size and thickness.

FIG. 17 shows arcuate tubes 70 and 71 supported on legs 73 and 74 and held on the pipe 75 by tensioning bands 76 and 77. Excepting mode of support on the pipe, these tubes are identical to the tube 60 of FIG. 16. Each arcuate tube extends peripherally about 175 degrees around the pipe with two halves defining an interrupted toroid. One such toroid may be used, two are shown with one above and one below the weld W2. Pressurized air is admitted through ports 78 and 79 and the air is discharged against the pipe surface in jets J1 and J2 that result from holes in the arcuate tubes. The holes are distributed at about twenty degree intervals.

Figure 18:
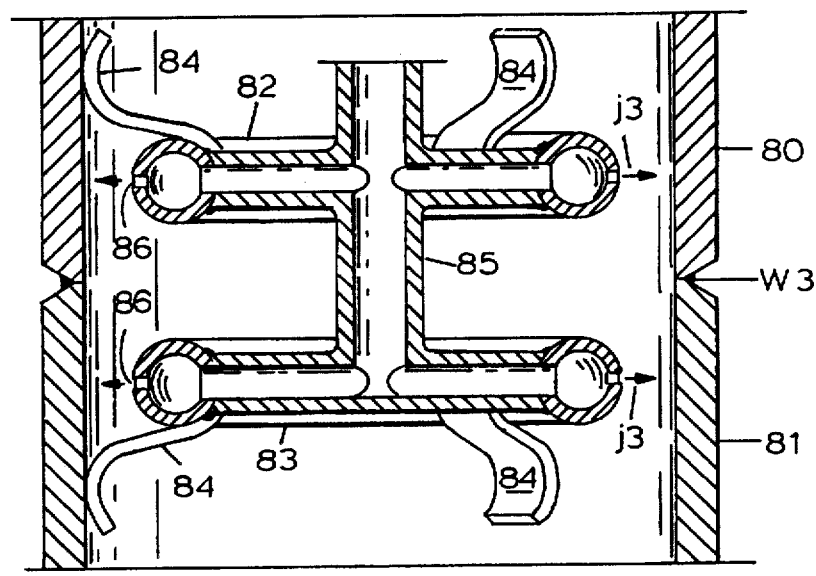
FIG. 18 is a side view, mostly cut away, showing a cooling spool comprising centralized toroidal air distribution rings joined by an air supply manifold.
Figure 19:
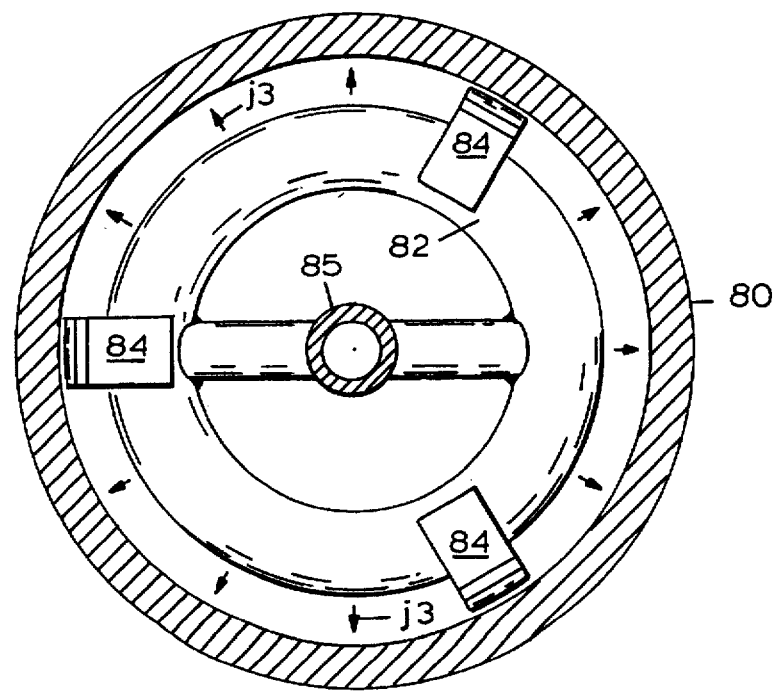
FIG. 19 is an orthogonal view, from below, of the cooling apparatus of FIG. 18.

FIGS. 18 and 19 show upper pipe section 80 and lower pipe section 81 with one weld pass W3 joining them. Before more welding proceeds the cooling spool consisting primarily of two toroidal air distribution tubes 82 and 83, centralizing legs 84 and joining air manifold 85 is lowered into the pipe bore. An air supply hose, not shown, may support the spool as well as supply pressurized air. When pressurized air is supplied to the manifold it is expanded through jets J3 against the inner wall of the pipe. Small holes 86 in the walls of the toroidal tubes, peripherally distributed at about twenty degree intervals, provide cooling during the welding process. The first pass bead seals the seam to prevent condensate from contacting molten metal when welding continues to build up the final bead. The top view, FIG. 19, shows the spool generally centralized on legs 84. The legs are not essential because the flow of air pushes the toroids away from the walls but the lowering and raising of the spool through the bore of the last joint tends to damage the simple jet holes. There are plans to use a small weld deposit between holes, on the outer extreme of the toroids, to protect the holes.

Figure 20:
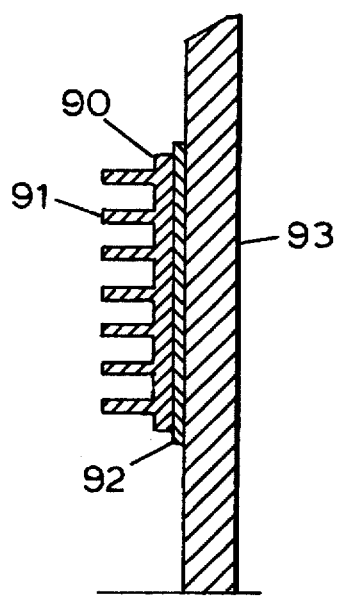
FIG. 20 is a sectioned view from the aspect of FIG. 15 showing a portion of a finned cooling cuff.

In cold weather the cooling of pipe poses a smaller problem and offers an opportunity to simplify apparatus such as the cooling band 90 shown in FIG. 20. This band is situated and supported in exactly the same manner as that shown in FIGS. 13 and 14. The only difference pertains to the absence of a fluid conducting channel and the presence of fins 91 on the outer periphery. The fins seem to provide about the same stiffness to each arcuate half and the heat transfer sheet 92 is still needed between cuff and pipe From the foregoing, it will be seen that this invention is one well adapted to attain all of the ends and objects hereinabove set forth, together with other advantages which are obvious and which are inherent to the apparatus and method.

It will be understood that certain features and sub combinations are of utility and may be employed without reference to other features and sub combinations. This is contemplated by and is within the scope of the claims.

As many possible embodiments may be made of the tool of this invention without departing from the scope thereof, it is to be understood that all matter herein set forth or shown in the accompanying drawings is to be interpreted as illustrative and not in a limiting sense.

The invention having been described, we claim:

1. An improved pipe section weldment for attaching by welding, in longitudinal series, to a vertical pipe string, said weldment comprising:

a. an elongated pipe section, and
   b. at least one improved padeye welded to the outside surface and near an end of said pipe section, said padeye comprising: an elongated generally flat plate having opposed faces bounded by sides, a first side welded to said pipe and being divided into a first and a second welded zone by an opening extending radially some distance into said plate, a second side defining the end of said padeye oriented toward the nearest end of said section, a third side to define the greatest radial distance from the axis of said section, a fourth side opposite said second side and providing a rest surface for axial support of said section, and a transverse hole penetrating said faces to receive a bolt for a shackle.

2. The improved weldment of claim 1 wherein said opening and said hole are combined into one elongated opening.

* * * * *